United States Patent
Frost

(10) Patent No.: US 6,609,454 B2
(45) Date of Patent: Aug. 26, 2003

(54) PISTON WITH SEAL

(75) Inventor: Stanley A. Frost, Portland, OR (US)

(73) Assignee: AFM, Incorporated, Tigard, OR (US)

( * ) Notice: Subject to any disclaimer, the term of this patent is extended or adjusted under 35 U.S.C. 154(b) by 172 days.

(21) Appl. No.: 09/849,151

(22) Filed: May 4, 2001

(65) Prior Publication Data

US 2002/0162450 A1 Nov. 7, 2002

(51) Int. Cl.[7] .................................................. F16J 1/00
(52) U.S. Cl. ........................... 92/212; 92/224; 92/245; 138/31
(58) Field of Search .......................... 92/212, 224, 223, 92/248, 249, 240, 245, 242; 138/31

(56) References Cited

U.S. PATENT DOCUMENTS

| | | |
|---|---|---|
| 3,388,638 A | 6/1968 | Brinkel |
| 3,703,125 A | 11/1972 | Pauliukonis |
| 4,214,507 A | 7/1980 | Hock et al. |
| 4,727,795 A * | 3/1988 | Murray et al. ................. 92/212 |
| 4,790,726 A * | 12/1988 | Balkau et al. ................. 92/212 |
| 4,821,627 A | 4/1989 | Leigh-Monstevens |
| 5,070,971 A | 12/1991 | Dourson et al. |
| 5,249,649 A * | 10/1993 | Emmons ...................... 188/370 |
| 5,484,041 A * | 1/1996 | Cadaret et al. ............. 188/72.4 |
| 5,992,948 A * | 11/1999 | Gowda ...................... 303/116.1 |
| 6,085,636 A * | 7/2000 | Ruckert et al. ................. 92/254 |

FOREIGN PATENT DOCUMENTS

JP       57149657 A * 9/1982  ............ F16J/01/01

* cited by examiner

*Primary Examiner*—Edward K. Look
*Assistant Examiner*—Igor Kershteyn
(74) *Attorney, Agent, or Firm*—Robert D. Varitz, P.C.

(57) ABSTRACT

A method of forming a floating piston includes fabricating a piston cup, wherein the piston cup includes a top, a sidewall void of any seal-gripping irregularities, and an open end, and forming an elastomer seal over the sidewall of the piston cup. A floating piston includes a piston cup having a top, a sidewall extending about the periphery of the top and an open end, wherein the sidewall is void of any seal-gripping irregularities; and an elastomer seal formed about the sidewall of the piston cup.

18 Claims, 1 Drawing Sheet

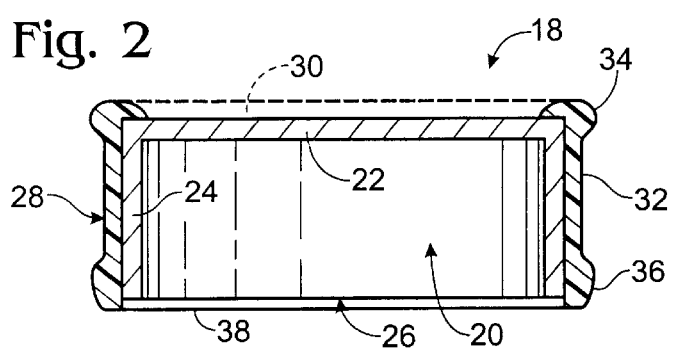
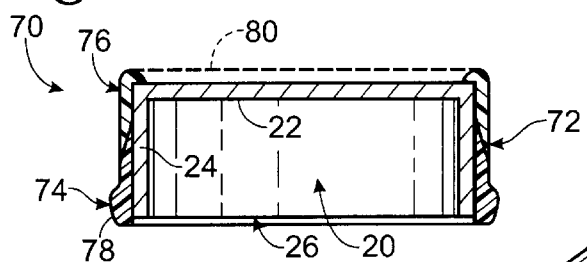
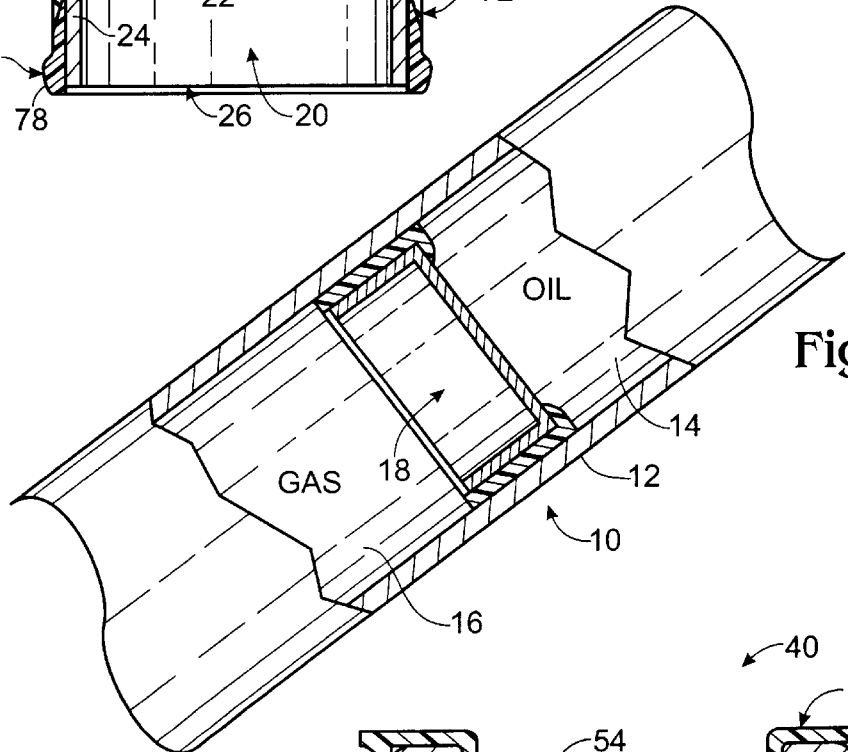
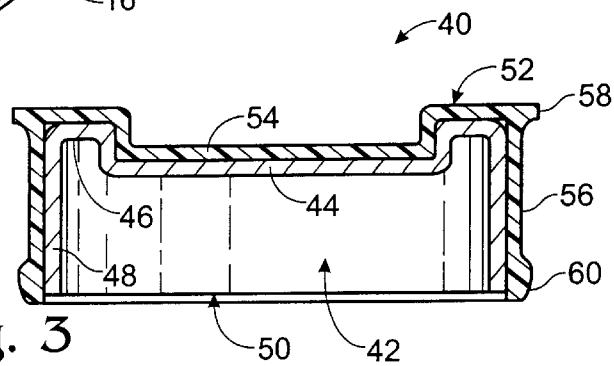

PISTON WITH SEAL

FIELD OF THE INVENTION

This invention relates to piston seals, and specifically to a piston having a seal formed thereon. The piston and seal of the invention are particularly suited for use as a floating piston with seal.

BACKGROUND OF THE INVENTION

A floating piston is used to separate a gas from a liquid in a hydraulic cylinder. The floating piston moves axially when a pressure drop across it is sufficient to overcome seal friction. There is no actuation rod attached to a floating piston. Conventional pistons are enclosed in a cylinder and connected to an actuation rod.

Floating pistons are commonly used in hydraulic accumulators and gas-loaded shock absorbers. Shock absorbers used for car and truck suspensions, and shocks for bicycles, snowmobiles and truck seats use millions of floating pistons. Prior art floating pistons and conventional pistons use a screw-machined aluminum or steel plug, having an O-ring, or similar seal, groove or surface irregularity machined into the outer surface of the plug, and an elastomer seal received in the groove or on the irregularity.

U.S. Pat. No. 3,388,638, to Brinkel for Piston, granted Jun. 18, 1968, describes a piston wherein the piston body and seal are fabricated as an integral unit, which appears to be manufactured from an elastomer material. As such, there is no distinction between the piston and the seal.

U.S. Pat. No. 3,703,125, to Pauliukonis for Plastic actuating cylinder, granted Nov. 21, 1972, describes a piston and a cylinder having an integrally molded end closure. The piston and cylinder are formed of plastomer material. The piston and seal appear to be formed from the same material (FIG. 4).

U.S. Pat. No. 4,214,507, to Hock et al. for One-piece plastic piston, describes a piston having a rigid thermoplastic molded core and a seal element molded in the core from a flexible thermo plastic material thereby forming a unitary assembly. The piston has a flange formed about its periphery to retain a seal thereon.

U.S. Pat. No. 4,821,627, to Leigh-Monstevens for Piston and cylinder assembly, granted Apr. 18, 1989, describes a piston and cylinder assembly wherein a seal may be secured to piston by dipping and end portion of the piston into an adhesive, placing the end portion into a molding tool, closing the tool, and injecting rubber into the tool in a surrounding relation with respect to end portion 20$b$, resulting in a bonding of the rubber material to the piston. The piston configurations incorporate some irregularity, to secure the seal to the piston.

U.S. Pat. No. 5,070,971, to Dourson et al. for Molded piston for a hydraulic damper, granted Dec. 10, 1991, describes a molded piston which is formed of a flexible plastic.

SUMMARY OF THE INVENTION

A method of forming a piston includes fabricating a piston cup, wherein the piston cup includes a top, a sidewall void of any seal-gripping irregularities, and an open end, and forming an elastomer seal over the sidewall, and, in some instances, over the top, of the piston cup.

A piston includes a piston cup having a top, a sidewall extending about the periphery of the top and an open end, wherein the sidewall is void of any seal-gripping irregularities. An elastomer seal is formed about the sidewall of the piston cup.

It is an object of the invention to provide an integrally formed piston and seal therefor.

It is another object of the invention to provide a floating piston which is easy to manufacture, and which has a relatively low manufacturing cost.

This summary and objectives of the invention are provided to enable quick comprehension of the nature of the invention. A more thorough understanding of the invention may be obtained by reference to the following detailed description of the preferred embodiment of the invention in connection with the drawings.

BRIEF DESCRIPTION OF THE DRAWINGS

FIG. 1 is an environmental view depicting a piston constructed according to the method of the invention in a cylinder.

FIG. 2 is a cross-section of a piston having a seal formed thereon.

FIG. 3 is a cross-section of a piston having an alternate form of the seal of the invention formed thereon.

FIG. 4 is a cross-section of a piston having a bi-material form of the seal of the invention formed thereon.

DETAILED DESCRIPTION OF THE PREFERRED EMBODIMENT

The invention includes a piston and seal therefor, wherein the seal is formed directly on the piston, and wherein the piston has a smooth exterior surface, meaning that there is no need for a groove, or other surface irregularity, to hold the seal in place on the piston. Formation of a piston and seal according to the method of the invention eliminates the seal assembly procedure, and also eliminates purchasing, inspecting and inventory tracking of one part number. This is a significant savings for the manufacturer and distributer of the piston. If a cylinder using a piston constructed according to the method of the invention needs to be repaired, the piston may be replaced as a unit, without the need for on-site assembly of a piston and a seal therefor.

The first embodiment of the method of the invention includes manufacturing a piston by forming a piston cup, usually out of aluminum or steel sheet material, into a "cup like" core. This may be done by stamping or other mechanical forming techniques. An elastomer seal is then transfer molded onto the prepared outer surface of the piston. Common elastomers that are compatible with mineral oil and low unit cost are nitrile butadiene rubber (NBR), ethylenepropylenediene monomer (EPDM) and fluoro elastomers, such as Viton® synthetic rubber or perfluoroalkyoxy-polymers (PFAs), which has the structure: $[CF(OR,)-CF_2(CF_2-CF_2)n]m$, where OR represents a perfluoroalkoxy group. PFA may be melt processed, i.e., extruded. The chemical resistance is comparable to polytetrafluoroethylene (PTFE). PFA is translucent and slightly flexible. It has greater mechanical strength and higher temperature tolerance than PTFE. Its melting temperature is 305° C. Tooling costs are relatively small with this method of manufacturing. The method of the invention does not require that the piston have any grooves, or other surface irregularities cut therein to hold the seal in place. Although the piston and seal constructed according to the method of the invention are particularly well suited for use as a floating piston, it may also be used in a conventional hydraulic or pneumatic cylinder with a piston rod.

The second embodiment of the method of the invention is to injection mold the piston core, and then "overmold" a thermoplastic elastomer seal on the outer surface of the piston core. In some instances, as for large size pistons, diametrical reinforcing webbing may be used in the seal. While tooling cost are higher with this embodiment of the invention, injection molding enables formation of large size pistons and seals.

Another embodiment includes a bi-material seal, wherein a first seal portion is formed about the lower portion of the piston cup and a second seal portion, usually formed of a different elastomer, is formed about the upper portion of the piston cup. In the preferred embodiment, the first seal portion is formed of NBR and the second seal portion is formed of a fluoroelastomer, such as Viton® synthetic rubber or PFA elastomer.

These manufacturing methods produce pistons having a significantly lower cost-per-unit than pistons manufactured by a machining process wherein the piston core is machined, a seal is manufactured, and the core and the seal are mated to form the finished piston.

Referring now to FIG. 1, a hydraulic cylinder 10 is depicted with portions of a cylinder wall 12 broken away to show the interior mechanism of the cylinder. Cylinder 10 includes an oil side 14, which contains mineral oil, or other non-reactive liquid, and a gas side 16, which contains air or some inert gas. Oil side 14 and gas side 16 are separated by a piston 18 constructed according to the invention, which is depicted as a floating piston.

Piston 18, as shown in FIG. 2, includes a piston cup 20, which is formed from a metal or polymer. Suitable metals are aluminum, steel, carbon steel or stainless steel. Cup 20 may be formed by virtually any fabricating technique, such as stamping, molding, injection molding and machining. Cup 20 includes a top 22, a sidewall 24 and an open end 26. Sidewall 24 is smooth, and lacks the usual groove for seating a seal or piston ring. Thus, sidewall 24 is void of any seal-gripping irregularities. Cup 20 is substantially covered by an elastomer seal 28. Seal 28 may be formed of various elastomer materials, such as a rubber like NBR, or a fluoro elastomer, such as Viton® synthetic rubber, PFA or EPDM. Seal 28 may includes a top 30, shown in dashed lines in FIG. 2, however, for reasons of economy of manufacturing, the top of the piston may be left substantially bare of elastomer. Seal 28 includes a side wall 32. Seal top 30, when present, and seal sidewall 32, are conformal with cup top 22 and sidewall 24, respectively. Seal 28 also includes an upper lip 34 and a lower lip 36, which provide a snug fit inside a cylinder. An overhang portion 28 of seal sidewall 32 extends beyond the margin of cup open end 26.

A second form of the floating piston structure of the invention is depicted in FIG. 3, generally at 40. Piston 40 includes a piston cup 42, having a top 44, which includes a peripheral flange 46 extending above the upper surface of cup top 44. Piston cup 42 includes a sidewall 48, which is smooth and which does not have any form of grooving thereon. One end 50 of cup 42 is open. An elastomer seal 52 extends over the top and sidewalls of cup 42. Seal 52 includes a seal top 54 and sidewall 56. Seal top 54 is conformal with cup top 44 and peripheral flange 46. A seal upper lip 58 and a seal lower lip 60 are formed with seal sidewall 48. As with the structure of FIG. 2, a portion of sidewall 56 overhangs piston cup 42, forming a seal overhang 62. Also, seal top 54 may cover only a portion of piston top 44.

The embodiment of the piston and seal of the invention depicted generally at 70 in FIG. 4 includes a bi-material seal. Like piston 18 of FIG. 2, the piston includes a piston cup 20 having a top 22, a sidewall 24 and an open end 26. An elastomer seal 72 includes a first portion 74, which is formed of a first elastomer material, about the lower portion of cup 20, adjacent open end 26 thereof, and a second portion 76, formed of a second elastomer material, about the upper portion of cup 20, adjacent top 22, which acts as a bearing material to facilitate movement of the piston within the cylinder, and which has a greater wear life than does the first elastomer material. In the preferred embodiment, the first portion is formed of NBR, and includes a lower lip 78, while second seal portion 76 is formed of PFA. This arrangement provides an exceptionally strong and chemical resistant seal for coaction with the oil side of a cylinder, while providing a resilient seal for coaction with the air side of a cylinder. The seal may be formed of two portions of the same elastomer material wherein the first and second elastomer material may have different moduli of elasticity.

Thus, a method for fabricating a floating piston and a seal therefore has been disclosed. It will be appreciated that further variations and modifications thereof may be made within the scope of the invention as defined in the appended claims.

I claim:

1. A method of forming a piston comprising:

fabricating a piston cup, wherein the piston cup includes a top, a sidewall void of any seal-gripping irregularities, and an open end, and forming an elastomer seal over the sidewall of the piston cup, including forming a seal overhang which extends beyond the margin of the piston cup open end.

2. The method of claim 1 wherein said forming includes forming the elastomer seal over the top of the piston cup.

3. The method of claim 1 wherein said fabricating includes shaping the piston cup by a fabrication technique taken from the group of techniques consisting of stamping, molding, injection molding and machining.

4. The method of claim 1 wherein said fabricating includes applying the elastomer seal to the piston cup by a technique taken from the group of techniques consisting of molding, injection molding and overmolding.

5. The method of claim 1 which includes selecting an elastomer from the group of elastomers consisting of nitrile butadiene rubber, fluoro elastomers, including perfluoroalkyoxy-polymers, and ethylenepropylenediene monomer.

6. The method of claim 1 wherein said forming includes forming a bi-material elastomer seal having a first seal portion formed about the lower portion of the piston cup of a first elastomer material and a second seal portion formed about the upper portion of the piston cup of a second elastomer material.

7. The method of claim 6 which includes selecting nitrile butadiene rubber as the first elastomer material and selecting a perfluoroalkyoxy-polymer as the second elastomer material.

8. A piston comprising:

a piston cup having a top, a sidewall extending about the periphery of the top and an open end, said sidewall is void of any seal-gripping structures; and an elastomer seal formed about said sidewall of said piston cup, including a first seal portion formed about the lower portion of said piston cup of a first elastomer material and a second seal portion formed about the upper portion of said piston cup of a second elastomer material.

9. The piston of claim 8 wherein said elastomer seal is formed over said piston top.

10. The piston of claim 8 wherein said elastomer seal extends beyond the margin of said sidewall adjacent said open end.

11. The piston of claim 8 which further includes a peripheral flange extending about said top.

12. The piston of claim 8 wherein said elastomer is selected from the group of elastomers consisting of nitrile butadiene rubber, fluoro elastomers, including perfluoroalkyoxy-polymers and ethylenepropylenediene monomer.

13. The piston of claim 9 wherein said first elastomer material is nitrile butadiene rubber and said second elastomer material is a perfluoroalkyoxy-polymer.

14. A method of forming a piston comprising:
fabricating a piston cup, wherein the piston cup includes a top, a sidewall void of any seal-gripping irregularities, and an open end, and
forming an elastomer seal over the sidewall of the piston cup, including forming a bi-material elastomer seal having a first seal portion formed about the lower portion of the piston cup of a first elastomer material and a second seal portion formed about the upper portion of the piston cup of a second elastomer material.

15. The method of claim 14 wherein said forming includes forming the elastomer seal over the top of the piston cup and wherein said forming includes forming a seal overhang which extends beyond the margin of the piston cup open end.

16. The method of claim 14 wherein said fabricating includes shaping the piston cup by a fabrication technique taken from the group of techniques consisting of stamping, molding, injection molding and machining.

17. The method of claim 14 wherein said fabricating includes applying the elastomer seal to the piston cup by a technique taken from the group of techniques consisting of molding, injection molding and overmolding.

18. The method of claim 14 which includes selecting an elastomer from the group of elastomers consisting of nitrile butadiene rubber, fluoro elastomers, including perfluoroalkyoxy-polymers, and ethylenepropylenediene monomer.

* * * * *